United States Patent
Contos et al.

(10) Patent No.: US 7,349,755 B2
(45) Date of Patent: Mar. 25, 2008

(54) ELECTROCOAT MANAGEMENT SYSTEM

(75) Inventors: Michael A. Contos, Bettendorf, IA (US); Michael J. Bourdeau, Prior Lake, MN (US); Lonnie L. Pillar, Forest Lake, MN (US); Robert A. Sailer, Andover, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 534 days.

(21) Appl. No.: 10/793,361

(22) Filed: Mar. 4, 2004

(65) Prior Publication Data

US 2005/0010321 A1 Jan. 13, 2005

Related U.S. Application Data

(60) Provisional application No. 60/452,130, filed on Mar. 4, 2003.

(51) Int. Cl.
G06F 19/00 (2006.01)
(52) U.S. Cl. .................. 700/123; 700/266; 118/679; 204/472; 709/203
(58) Field of Classification Search ............... 700/123, 700/266; 118/665, 679; 204/472; 709/203
See application file for complete search history.

(56) References Cited

U.S. PATENT DOCUMENTS

| | | | |
|---|---|---|---|
| 4,185,970 A | 1/1980 | Dean | |
| 4,744,950 A | 5/1988 | Hollander | |
| 4,827,959 A | 5/1989 | Muccitelli | |
| 4,995,987 A | 2/1991 | Whitekettle et al. | |
| 5,059,492 A | 10/1991 | Shindou et al. | |
| 5,234,958 A | 8/1993 | Donofrio et al. | |
| 5,278,188 A | 1/1994 | Whitekettle et al. | |
| 5,352,706 A | 10/1994 | Donofrio et al. | |
| 5,416,109 A | 5/1995 | Donofrio et al. | |
| 5,416,122 A | 5/1995 | Donofrio et al. | |
| 5,430,078 A | 7/1995 | Hoppe-Hoeffler et al. | |
| 5,430,479 A | 7/1995 | Takahama et al. | |
| 5,512,186 A | 4/1996 | Wright et al. | |
| 5,603,941 A | 2/1997 | Farina et al. | |
| 5,611,939 A | 3/1997 | Hernandez-Mena et al. | |
| 5,624,810 A | 4/1997 | Miller et al. | |

(Continued)

FOREIGN PATENT DOCUMENTS

DE 19955372 5/2001

(Continued)

OTHER PUBLICATIONS

International Preliminary Report on Patentability for PCT/US2004/006683, mailed Feb. 3, 2005.

(Continued)

*Primary Examiner*—Kidest Bahta
*Assistant Examiner*—Sheela Rao
(74) *Attorney, Agent, or Firm*—Shumaker & Sieffert, P.A.

(57) ABSTRACT

A processor-based system for monitoring and optimizing an electrocoating operation comprising at least one data acquisition module configured to receive characteristics of the electrocoating operation and at least one process control module in communication with the at least one data acquisition module and the electrocoating operation. An electrocoating process that includes such a process or based system and methods of using the system are also disclosed.

21 Claims, 3 Drawing Sheets

U.S. PATENT DOCUMENTS

| | | | |
|---|---|---|---|
| 5,695,652 | A | 12/1997 | Hernandez-Mena et al. |
| 5,736,056 | A | 4/1998 | Wright et al. |
| 5,763,482 | A | 6/1998 | Paterson et al. |
| 5,891,702 | A | 4/1999 | Sakakibara et al. |
| 5,942,219 | A | 8/1999 | Hendriks |
| 5,997,812 | A | 12/1999 | Burnham et al. |
| 6,017,431 | A | 1/2000 | Augustini et al. |
| 6,066,479 | A | 5/2000 | Wright |
| 6,241,898 | B1 | 6/2001 | Wright et al. |
| 6,290,830 | B1 | 9/2001 | Kaylo et al. |
| 6,350,358 | B1 | 2/2002 | Ehmann et al. |
| 6,757,521 | B1* | 6/2004 | Ying .................. 455/67.11 |
| 6,872,291 | B2 | 3/2005 | Boyd et al. |
| 6,977,012 | B2* | 12/2005 | Nobutoh et al. ........... 118/665 |
| 6,977,013 | B2* | 12/2005 | Schroeder et al. ......... 118/679 |
| 2001/0008679 | A1 | 7/2001 | Layrolle et al. |
| 2003/0000837 | A1 | 1/2003 | Kaylo et al. |
| 2003/0177978 | A1 | 9/2003 | Nobutoh et al. |
| 2003/0204560 | A1* | 10/2003 | Chen et al. ................. 709/203 |

FOREIGN PATENT DOCUMENTS

| | | |
|---|---|---|
| EP | 1 239 061 | 9/2002 |
| WO | 99/03933 | 1/1999 |
| WO | WO 00/59834 | 10/2000 |
| WO | WO 01/62084 | 8/2001 |
| WO | WO 01/62091 | 8/2001 |
| WO | WO 03/004733 | 1/2003 |

OTHER PUBLICATIONS

PCT Written Opinion for PCT/US04/006684, mailed Feb. 11, 2005.

"Cell Analysis in Real-Time," PCI Paint & Coatings Industry, Biocides Equipment, 2003, 19(7):60-62.

Kraus, "Computerized Control of Electrocoat Processes," Electrocoat '86, 1986, 12-1-12-31.

McPheron, "Equipment," Electrocoat '98, 1998, 1-1-1-11.

Morris, "Monitoring Electrocoat Parameters and Statistical Process Control," Electrocoat '92, 1992, 8-1-8-10.

International Preliminary Report on Patentability for PCT/US2004/006495, mailed Jul. 14, 2005, 6 pages.

Czechowski, "ATP Technology, A Tool for Monitoring Microbes in Cooling Systems," American Power Conference, Chicago, IL, Apr. 10, 1996, 5 pages.

"Toxicant Evaluation BIOSCAN® ATP Method," MB012 0104, MB Procedures, 2001, BetzDearborn—A Division of Hercules Incorporated, 2 pages.

"Analysis of Biofilm Organisms Bioscan® ATP Method" MB013 014, MB Procedures, 2001, BetzDearborn—A Division of Hercules Incorporate, 4 pages.

"Monitoring of Microbes in Cooling Water BIOSCAN® ATP Method," MB014, MB Procedures, 2001, BetzDearborn—A Division of Hercules Incorporated, 3 pages.

"BIOSCAN™ 2 Luminometer Instruction Manual Code L6605," BetzDearborn—A Division of Hercules Incorporated, 12 pages.

"Standard Test Methods for Nonvolatile and Pigment Content of Electrocoat Baths," Designation: 5145-90 (Reapproved 1997), American Society for Testing and Materials (ASTM) pp. 581-582.

"Bioscan Sampling Pens," Product Instruction Street, BetzDearborn.

Lee and Deininger, "Rapid Quantification of Viable Bacteria in Water Using an ATP Assay," American Laboratory News, 2001, http://www.iscpubs.com/articles/aln/n01101ee.pdf, pp. 24-26.

"ENLITEN® ATP Assay System Bioluminescence Detection Kit for ATP," Technical Bulletin No. 267, Instructions for Use of Product FF2000, 2002, http://www.promega.com//tbs/tb267/tb267.pdf, Promega Corporation, 5 pages.

"PROFILE® 1 Rapid Bacteria Detection in Under 5 Minutes," http://www.nhdiag.com/profile_one.shtml, New Horizons Diagnostics Inc., 3 pages, printed Jan. 15, 2003.

"BIOSCAN™ 2 Microbiological Monitor," Product Fact Sheet, http://www.betzdearborn.com/ind_app_prod/product_family_links.asp?PFL-ID=FS&Pro..., BetzDearborn—A Division of Hercules Incorporated, 2 pages.

"Spectrus™ NX and BIOSCAN™ ATP Monitoring Dramatically Decrease Bulk Water Counts and Reduce Unscheduled Downtime at Steel Mill," Press Room: Customer Successes, http://www.betzdearborn.com/customer_successes/customersuccesses/asp?CS_ID=1107, Betzdearborn—A Division of Hercules Incorporated, 2 pages, printed Feb. 26, 2002.

"N-CON Systems BIOSCAN On-Line Toxicity or Treatment Inhibition Monitor Detect Inhibition Before it Becomes Toxicity!" http://www.n-con.com/bioscan.html, N-CON Systems Co., Crawford, GA, 5 pages, printed Oct. 12, 2004.

Wooten, "An Inhibition Monitor for Rapid Wastewater Screening," Water Environment Federation and Purdue University Industrial Wastes Technical Conference, 2000, St. Louis, MO, 10 pages.

Walker, "New Microbiological Monitoring Methods for Water Systems," Spec. Chem., 1993, 13(3): 110-111.

Winkowski, K. et al., "Controlling Microbial Contamination," Jul. 2002, Paint & Coatings Industry, vol. 18, Issue 7, p. 60-66.

Paint and Coatings Industry, "Paint and the Constant Threat of Microbial Attack: Why a Constant Vigil is Needed," Jul. 2000, p. 64-74.

Chu et al., "Using ATP Bioluminescence Technique for Monitoring Microbial Activity in Sludge," Biotechnology and Bioengineering, vol. 75, No. 4, Nov. 20, 2001, pp. 469-474.

\* cited by examiner

ELECTROCOAT MANAGEMENT SYSTEM

RELATED APPLICATIONS

This application claims the benefit of priority under 35 USC § 119(e)(1) of U.S. Provisional Application No. 60/452,130, filed on Mar. 4, 2003.

TECHNICAL FIELD

This invention relates to a computer-based manufacturing system, and more particularly to a monitoring and control system integrated with an electrocoating process.

BACKGROUND

Electrocoating, also referred to as e-coating, is a popular choice for applying electrodepositable coating compositions to metal substrates.

Operational parameters of an electrocoating operation are typically monitored on a daily basis. Due to the nature of a typical electrocoat process in which a process runs continuous from start to finish, in-process operational malfunctions can result in long periods of out of specification products. This can lead to increased operational costs, loss of capacity and decreased output.

It would be desirable to provide a system capable of monitoring an electrocoat finishing process on a real-time basis, where the system can be programmed to collect data and monitor the process daily as well as long term, to improve the process and optimize the operation. An apparatus and method to accomplish these objectives is needed.

SUMMARY

Certain embodiments of the invention provide a system that integrates real-time monitoring and process control with an electrocoat finishing operation to provide consistently high quality electrocoated products. The system gives electrocoat finishers the opportunity to optimize the process, thereby reducing operation cost. In certain embodiments, the apparatus can provide users access to process and product information, and/or edit control parameters via on-site connection or by remote access.

In an aspect of the invention, a processor-based system is provided for monitoring and optimizing an electrocoating operation. The system can include a data acquisition module configured to receive characteristics of the electrocoating operation; and a process control module in communication with the data acquisition module and the electrocoating operation. The data acquisition module can be integral with the process control module so that one central unit is capable of acquiring data and controlling the process.

In another aspect, a method for monitoring an electrocoating operation is provided. Electrocoating operations can contain numerous variables that represent characteristics of either product and/or process (e.g., set-up, in progress etc.) specifications. Thus, in one method according to the invention, the method can include: a) establishing an acceptable range for at least one characteristic of the operation; b) retrieving a value corresponding to the characteristic; c) analyzing the value; and d) assessing whether the value is within the acceptable range. The steps in the method can be repeated if desired, until a retrieved value falls within the acceptable range.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION OF THE PREFERRED EMBODIMENTS

A system that integrates an electrocoating process with real-time monitoring and controlling features has been developed to advantageously improve product quality and optimize the manufacturing process for efficient operation. The invention allows communication between an electrocoating operation and computerized modules that can, among other things, retrieve, store, analyze, inform, and control process parameters, process equipment, and in-progress equipment and product characteristics, and other information related to an electrocoating operation. The system can be configured to assist in day-to-day operation(s), intermittent maintenance, as well as provide on-going trend analysis and quality control of an electrocoating operation.

Figure 1:
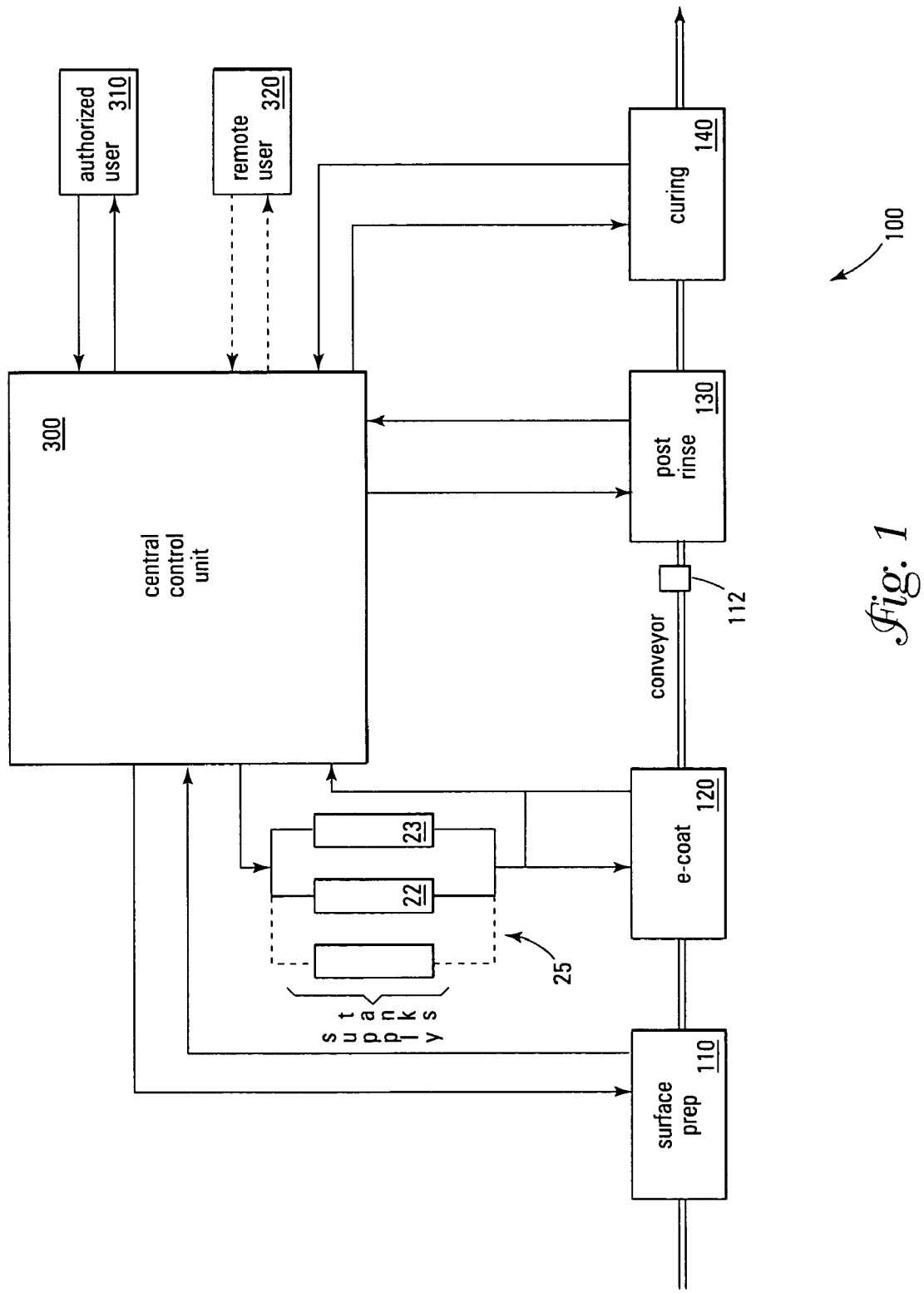
FIG. 1 is a block diagram depicting an exemplary electrocoating process of the invention.

Referring now to FIG. 1, a block diagram illustrates a general overview of a computer-based monitoring and control system integrated with an electrocoating operation pursuant to an aspect of the invention. The electrocoat process is typically configured and guided by predefined process specifications to apply an electrodepositable coating composition onto a substrate using electro-coat technology. The process specifications can include, for example, quality characteristics, ecological tolerances of the operation, and in-progress raw material equipment specifications and equipment operational specifications.

As seen in FIG. 1, an electrocoating process can include four main areas, depicted as process blocks 110, 120, 130, and 140, along with a line speed controller 112. A process mangement system 100 integrates equipment capable of data acquisition and process control with the process areas. Block 110 represents process stages that prepare a surface for application of an electrocoat paint. This portion of the process is often referred to as surface preparation or pretreatment. Block 120 represents the portion of process 100 where the coating is applied to a substrate. Electrocoating tanks and supply systems connected to the tanks can be included among other things, within block 120. Block 130 represents the post-coating treatments such as a post-rinse, or a series of post rinses. Finally, block 140 represents the curing section of process 100. This portion of an electrocoating process can include ovens, and other sources of heat.

Still referring to FIG. 1, it is shown that one central control unit 300 can be used to communicate with each of the process blocks 110 through 140. Control unit 300 can have data acquisition capability as well as process control capability. Data can be acquired from all or a selected portion of available equipment present in each of the process blocks 110 thru 140 and a line speed controller 112. It is within the purview of the invention that a control unit is capable of not only acquiring information (relating to the electrocoat process) but can also be used to load, store, and edit or modify in formation (e.g., programs, specifications, data, etc.). To control the electrocoat process, central control unit 300 can contain one master microprocessor or multiple microprocessors (e.g., computer cards, chips, programmable logic controllers, etc.), each microprocessor configured to control an individual or a grouping of equipment.

An authorized user 310, as shown in FIG. 1 can be directly linked to central control unit 300 to communicate with and monitor the electrocoating process. Alternatively and/or optionally, in addition to a directly linked authorized user, a remote (and authorized) user 320 can also have access to the information in unit 300. More than one directly linked user 310 or remote user 320 can be in communication with control unit 300.

It is contemplated that a remote user 320 can communicate with unit 300 via a variety of routes, including, but not limited to, wireless systems such as a pagers, mobile telephones, text messaging devices, and satellite-linked receivers and transceivers; computers or televisions linked via modem broadband internet satellite, etc.; telephones; and the like. For security purposes, it may be desirable to authorize only limited access or a tiered access, allowing certain users of control unit 300 to have "read-only" or "view-only" functions, while others are allowed to have capabilities beyond that. For example, a remote user 320 may be authorized only to the extent of loading programs or other information into control unit 300, but not allowed to delete or make modifications to programs, codes, etc. within control unit 300.

A supply tank system 25 can be linked into system 100 to allow automatic monitoring and control of liquid stream supply into block 120. One or more supply tanks such as 22, 23 can be included in supply tank system 25. Central control unit 300 can be used to assess the level of liquid supply (e.g., resin, paint, pH adjuster, etc.) inside tanks 22, 23. Similar to any other data the central control unit acquires, the information can be stored, manipulated, analyzed, charted, etc. Control unit 300 can also control the supply tanks by opening and closing appropriate valves (e.g. directing the valves to open or close) that allow liquid to enter block 120, or liquid to enter tanks 22 or 23 from a central supply (not shown).

Figure 2:
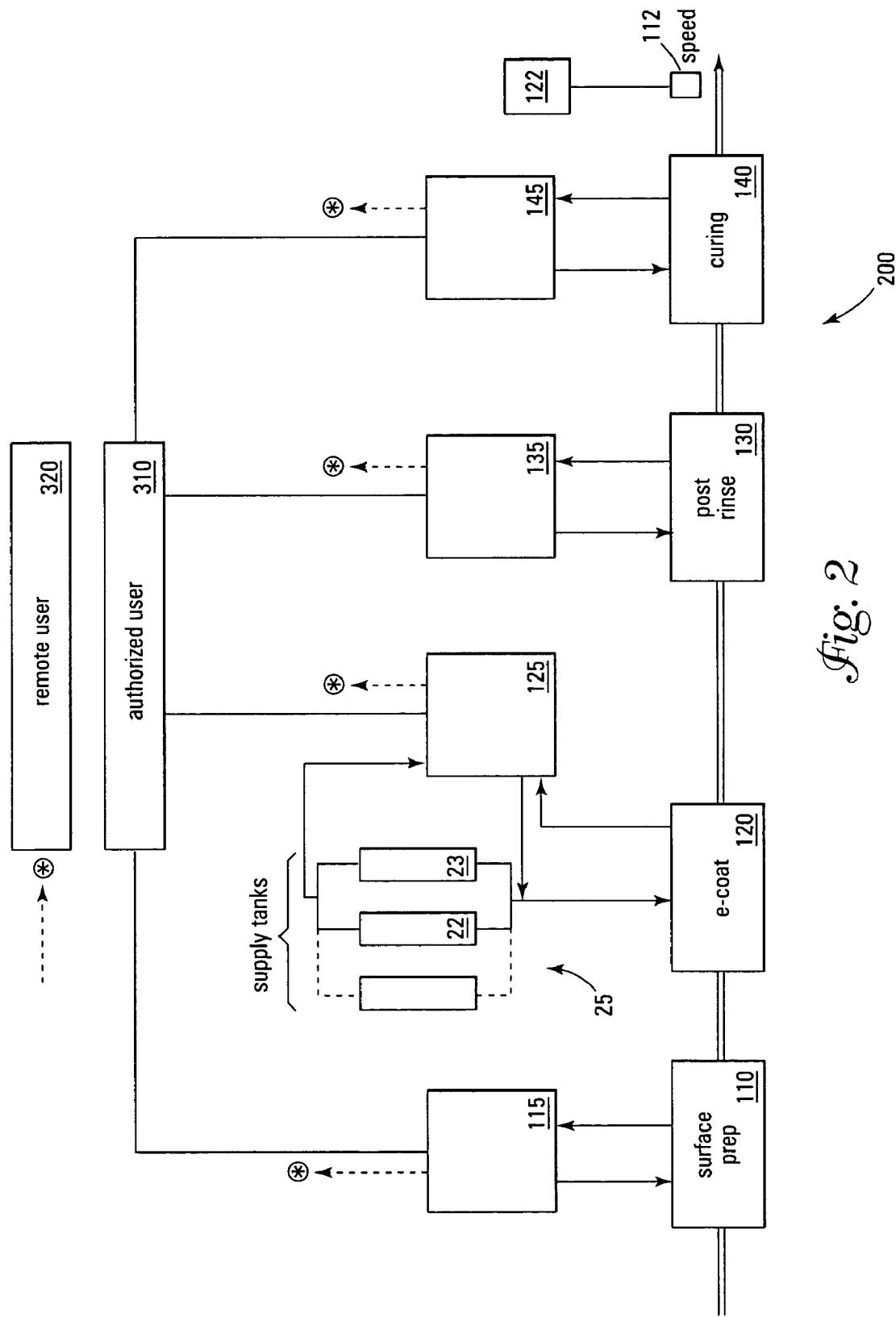
FIG. 2 is a block diagram depicting another example of an electrocoating process of the invention.

FIG. 2 illustrates another embodiment of the invention where each of the process blocks 110, 120, 130, 140, and line speed controller 112, are controlled and monitored using corresponding and separate modules 115, 125, 135, 145, and 122, respectively. This configuration may be advantageous in certain situations such as when one portion of process 200 tends to have greater amounts of downtime, requires more maintenance, or has significantly more data to retrieve, than other portions or blocks of the process. Thus, modules 115, 125, 135, 145 and 122 can, if desired, differ in size, speed, configuration and capability. Information, data, codes, etc. regarding equipment relevant to each process block, can be accessed individually or together via modules 115 thru 145 and/or 122. In similar fashion as the embodiment depicted in the FIG. 1 implementation, the information to, from, and within the modules can be accessed by one or more authorized user(s) 310 and/or remote user(s) 320, at different levels of access, if desired. Modules 115 thru 145 and 122 can individually be programmed and configured according to the needs of process 200. These modules can include directly inputted programs, or devices such as programmable logic controllers, or other processors or microprocessors. A central control unit (not shown) can optionally be integrated within system 200.

Figure 3:
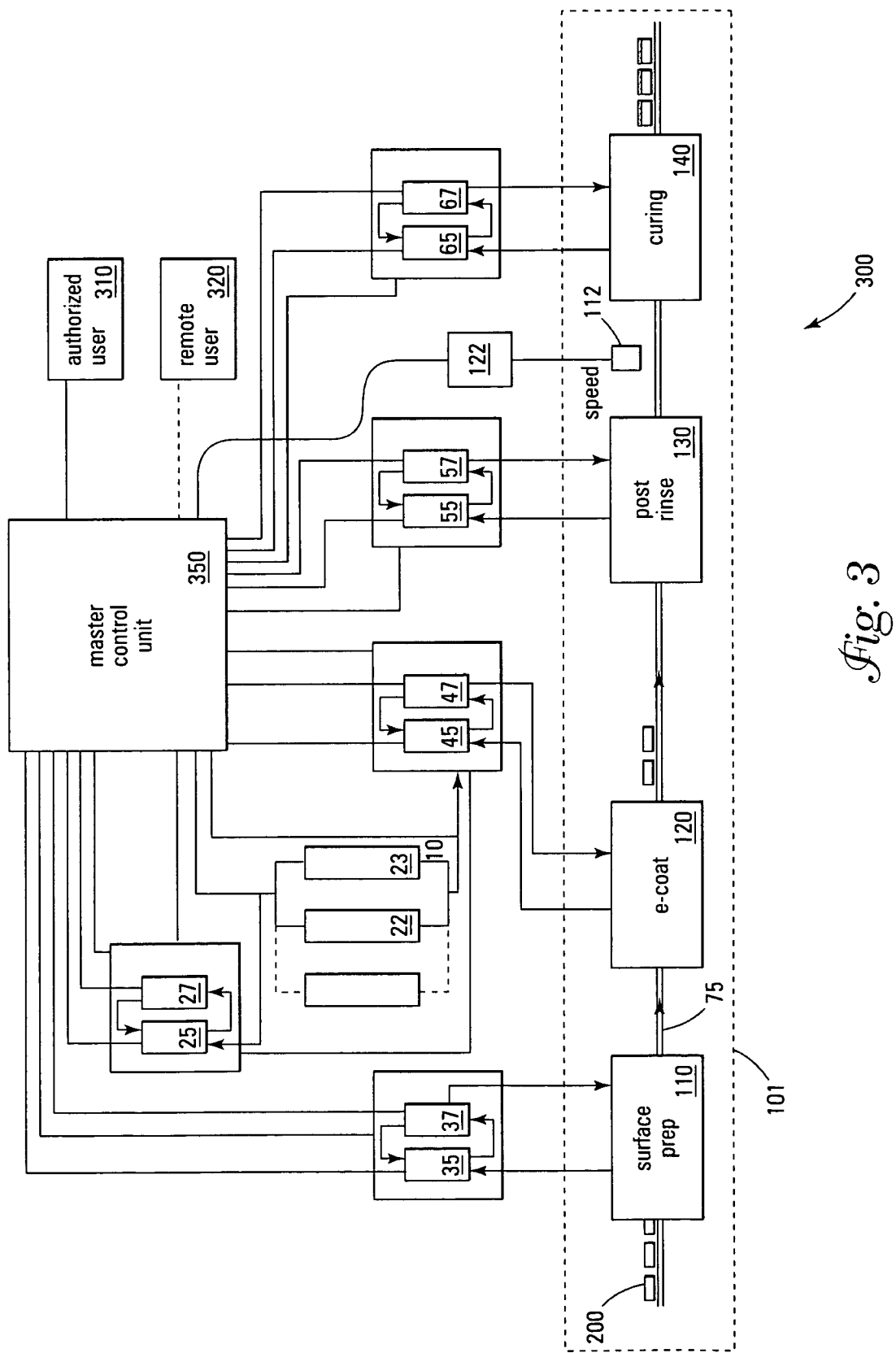
FIG. 3 is a block diagram depicting a further exemplary process according to the invention.

Referring now to FIG. 3, a schematic of yet another exemplary electrocoating system is provided. In this embodiment, multiple data acquisition modules are implemented with corresponding control modules, and each pair of data/control modules are linked to a process block. A master control unit 350 can optionally also be implemented into the system 300 to oversee the entire process, or even override each module, when necessary.

In FIG. 3, system 300 includes data acquisition modules 25, 35, 45, 55, and 65. The data acquisition modules can be configured to, among other things, retrieve, store, manipulate, and display significant quantities of data relative to measurable process and product specifications. Data can be retrieved by using probes, sensors, meters, or other qualitative or quantitative devices that can be linked to a data acquisition module. Depending on the level of observation desired, values for any or all product and/or process variables can be retrieved on an intermittent predetermined or scheduled basis. Alternatively, data can be retrieved on an on-demand basis. Data acquisition modules 25, 35, 45, 55, and 65 can be used to perform various functions, including retrieving, storing, manipulating, and displaying information. In certain embodiments, a system that includes data acquisition modules that are configured to additionally perform analyses can be configured within each acquisition module. For example, the modules can include software that provides historical trends, analysis of variance (ANOVA), statistical process control (SPC), compliance with International Standards Organization (ISO) standards, and the like.

Each data acquisition module can, although not necessarily, be coupled (e.g., interfaced) with at least one control module capable of thinking, operating and communicating with electrocoat process 101 to control the equipment, raw material and if desired, nearly all aspects of the process. Thus, a plurality of control modules, such as those depicted as control modules 37, 47, 57 and 67 can be implemented in the apparatus of the invention. These control modules can be devices such as programmable logic controllers (PLC) that are able to manipulate equipment based on a computer program having predetermined I/O directives. Conventional software developed for a PLC can be suitable for loading into the modules, or command-driven programs can be inputted directly into the control modules.

The data acquisition modules and/or the control modules can be networked in a variety of configurations to suit a user's needs. For example, all the modules can be linked to allow communication between and among themselves. Alternatively, the modules can be configured to only have selected modules be connected to one another. A further alternative is as shown in FIG. 3, where each pair of data/control modules are linked to a central or master control unit.

For convenience, the following description of the exemplary system according to the invention as depicted in FIG. 3 will be described generally from start to finish. It is of course, contemplated that many variations and additional equipment (filters, heat exchangers, piping systems, etc.) can be implemented within the process and are not shown. The figures and this narrative are limited to major process steps or blocks of steps that are used to apply an electrodepositable coatings onto a substrate; however it is not intended to limit the breadth of this invention's applicability to all (types of) electro-coating processes.

Referring again to FIG. 3, at the start of the electrocoat process 101 is a loading station where substrate 200 (and typically a plurality of substrates) is placed on a conveyor system 75. Conveyor 75 moves the substrate sequentially through process blocks 110 through 140 at a desired line speed. Although not shown in the figure, equipment (e.g., speed controller 122) that maintains or changes the line speed of conveyor 75 can be anywhere along process 100 from start to end.

Substrate 200 enters block 110 to prepare a target area on a surface of substrate 200 for electrocoating. This portion of the process is often referred to as surface preparation or pre-treatment. Block 110 typically comprises a series of stages. For example, substrate 200 may be subjected to one or more stages of cleaning, rinsing, sealing, or phosphating. A data acquisition module 35 can be designated to retrieve equipment-related and in-process information from block 110, using, for example, equipment or product evaluation tools (e.g., sensors, probes, meters, etc.) within the block. In particular, information acquired by module 35 can relate to equipment variables, how well the equipment in block 110 is performing the surface preparation, and the quality level of the surface preparation of substrate 200. The acquired information can include, for example, rinse water levels, bacteria levels in such rinse water, pH, temperature, pressure, conductivity, circulation flow rate, dip or dwell time, totalizers (e.g. volume totals), etc. Probes, gauges, meters, sensors, test equipment, or any other known qualitative or quantitative tool can be used to evaluate each variable as appropriate.

A control module 37 can be interfaced with data acquisition module 35 to control equipment within block 110, such as spray equipment, valves, etc. Adjustments to the equipment within block 110 can be made in an automated fashion by connecting (e.g. electrically, mechanically, or pneumatically) module 37 to each piece of equipment. Automated adjustments or modification can be achieved by linking or coupling control module 37 to actual equipment. For example, a signal generated by control module 37 can be communicated to a receiver coupled to a valve, which subsequently activates a handle or other means to turn and adjust the flow rate of fluid traveling past a valve. It is contemplated that adjustments to equipment, and therefore product, can be made purposefully or at pre-scheduled times, as in start-ups, or downtime for maintenance, etc.

Alternatively, adjustments initiated by control module 37 might be performed on an ongoing basis, particularly when information from data acquisition module 35 suggests that adjustments are required to compensate, react to, or prevent, out of specification process or product valuations. In situations where a process and/or product variable is beyond a pre-specified range, module 37 can not only react and modify equipment, but it can also communicate the need by also functioning as an alert signal. This can be accomplished by either displaying a light, sounding an alarm or siren, raising a flag, or the like. Any one or a combination of these or other various known audible or visible signals can be configured into module 37. Alternatively, the alert condition can be communicated to master control unit 350 which can provide the audible or visible signal.

It is within the purview of the invention that data acquisition module 35 could also be configured to process acquired data in such a way that out of specification values can be identified and be brought to attention by an alert signal. Thus, the signal need not be performed by a control module 37, but could also be achieved by a data acquisition module, such as shown module 35. A further alternative to achieving alert signals is by configuring either one or both modules 35 or 37 to communicate with a master control unit 350. By doing so, an authorized user can be alerted via a computer, phone call, text message, beeper, etc. Although this discussion of the functionalities, capabilities and configurations of a control module have been detailed in light of module 37, it is contemplated that any or all control modules described herein (e.g. modules 47, 57, 67) can also include such characteristics.

For illustration purposes only, an exemplary situation of how module(s) 35 and/or 37 can detect alert conditions, provide alert signals, and react to such conditions, is now provided. Within block 110, a variety of alert situations can occur, including for example, off-target pressure, lack of conductivity, off-target pH, and equipment malfunctions. Data acquisition module 35 can determine, for example, that the pH of a liquid stream used in the pre-treatment area of an electrocoat process, at some moment in time, is out of a desired range. The pH can be monitored by module 35 by receiving a "reading" from, for example, a pH meter. An alert condition for the pH can be communicated by module 35 to personnel immediately adjacent to the process by a visible or audible signal, or it can then be communicated to control module 37, which then can process the information also display the alert condition, and/or react accordingly. Such a reaction can be in the form of an alert signal similar to that of module 35, or it can be a physical modification to or manipulation of, for example, a valve (or switch) such that the valve stays open for a sufficient amount of time to allow a pH changing material (e.g. base or acid) to flow into the liquid stream and thereby adjust the pH. A subsequent pH reading could then be obtained by module 35, and continued to be repeated, until the pH is back within the specified range. In another example, an out of range pressure detected by data acquisition module 35 can be dealt with by either alerting personnel of the situation via an alarm or text-based signal, or by manipulating equipment such as relief valves to adjust the pressure accordingly.

As previously described, a display component can also be included in either module 35 or 37. This can be useful for allowing authorized users to view or monitor situations directly corresponding to block 110 and equipment therein. For example, a module 37 can have a display screen, wherein data is charted (raw or manipulated) and shown on real-time basis, or historically. A printer can also be connected to a module to download and print such information.

Now moving downstream in process 101, process block 120 represents the portion of process 101 where the electrocoatable composition is applied to a substrate. This section of the process generally includes, but is not limited to, the electrocoat tank(s), coating liquid delivery systems, ultrafiltration system, anodes, cathodes, rectifier/electrical systems, water supply systems (deionized/reverse osmosis—"DI/RO"), heat exchangers, and filters. Again, a data acquisition module 45, equipped with evaluation tools connected to equipment within block 120, can be used to acquire, process and/or product characteristics as target substrate 200 travels within block 120. The information can then be stored, analyzed, etc. within module 45, in similar fashion and technique as module 35. Module 45 communicates with control module 47 and/or master control unit 350.

Ancillary to block 120 is the supply of electrocoating or electrodepositable coating composition that can enter block 120 and be introduced to the process through at least one entry stream. Generally, electrodepositable coating composition material 10 is supplied by an outside source (not shown) and can be stored in a system of multiple tanks such as tanks 22, 23; however it is contemplated that electrodepositable coating composition material 10 can be produced within the same facility as the electro-coat operation.

Information relative to tanks 22, 23 and the compositions therein, can be monitored by data acquisition module 25. Data acquisition module 25 is preferably (coupled) interfaced with a control module 27 configured to control the raw material entry portion or the upstream section of process 101. Optionally, data acquisition module 25 can be coupled with data acquisition module 45 to communicate or exchange information. Similarly, the control modules 27 and 47 coupled to data acquisition modules 25 and 45, respectively, can also be linked to each other to allow communication and exchange of information. This can be advantageous when automated supply and replenishment of the supply from tanks 22 or 23 into block 120 is implemented. Alternatively, modules 25 and/or 27 can communicate to 45 and/or 47 through a master control unit 350 or even directly with unit 350.

As with most data acquisition modules in the system, module 45 can be configured to retrieve and log a variety of and numerous characteristics. For example, the amount of material (e.g., electrodepositable coating composition or components thereof) introduced into a tank (not shown) within block 120 can be monitored. Other characteristics of material or liquid streams that can be monitored by 25 and/or 45 include, but are not limited to, concentration, percent solids, pH, temperature, liquid level, and flowrate. For modules 25 or 45 to acquire information, a plurality of evaluation tools can be connected and in communication with the modules.

In certain circumstances, an admixture of several raw material streams, based on a formulation, may be used to make electrodepositable coating composition. Exemplary streams include, among other compounds, pigment, resin, solvent, and additives (e.g. wetting agents, surfactants, microgels, defoamers, pH controllers, catalysts, flatting agents, film builders, etc). Additives may already exist in a raw material stream. Where electrodepositable coating composition 10 is made from multiple inlet streams, a formulation guide can be inputted into control module 25 and communicated to a control module 27 to control key parameters that can achieve a desired electrodepositable coating composition. For example, guidelines or specifications for volumetric amounts, temperature and type of material (or stream) can be stored in the data structure of module 25. Control block 27 can then retrieve a stored formulation and use it to operate and optimize at least a portion of electrocoat operation 101.

Control module 27 preferably communicates with and controls (e.g. manipulating, or engaging on/off switches) apparatuses such as valves, pumps etc. specifically related to the electrodepositable coating composition supply 10. For example, control module 27 can be used to add pre-determined volumes of electrodepositable coating composition 10 or components thereof, or change the amount or rate of electrodepositable coating composition 10 entering process 101. Alarm conditions can be monitored and dealt with on a timely basis using the monitoring process of the invention.

As previously described in the context of implementation exemplified in FIGS. 1 and 2, alarm or alert signals configurable within a module can include, for example, lights, audible devices, beacons, etc.

For example, a type of alarm condition is the malfunction of a rectifier. Conventionally, an electrocoating system has no response to such an alarm, but rather, parts will not be coated as they continue traveling through the process. The rejected parts can be unnoticed for long periods of time. In the practice of the invention, however, an appropriate response can be programmed within a control module to respond to the alarm condition.

Data acquisition module 45 can be used to monitor numerous parameters that can be detected within block 120. The following description merely provides certain examples of the parameters that can be monitored by module 45, as it is contemplated that many more process and product related variables from each of the equipment within block 120 can be attended to by module 45. Thus, for example, among other things, the electrocoating tank within block 120 can be monitored to assure that conductivity, pH, bath temperature, liquid level(s), flow rate(s) and header pressure are within pre-determined specifications. All pumps and totalizing meters related to materials in the electrocoating tank can also be monitored to check their status and proper function. Process parameters that correlate to a rectifier or electrical system can also be configured within block 120 and linked to modules 45 and 47. The parameters can include, but are not limited to, an amp-hour meter, voltmeter, pump status, DI water totalizing meter, and the electrolyte's conductivity, pH, turbidity meter and flow rate. Any out of specification values or alert conditions (e.g. malfunction) obtained by module 45 can initiate a response by control module 47.

As has been indicated herein, configuring a computer-based monitoring and control system within an electrocoating process can provide beneficial capabilities besides merely acquiring and storing information. Detected out of range values can indicate not only the fact that a parameter is outside a predetermined range, but also that another unexpected or undesired condition may have or may be occurring. Such situations can affect the process, efficiency, productivity, and efficacy. For example, a high, out of range amp-hour meter reading from within block 120 can be indicative of an out-of-specification value; however, an authorized and trained recipient of such information can interpret the reading as indicative of a condition where a rupture or excessive film build is occurring, or has occurred. This condition may lead to excessive paint usage, an undesirable effect on efficiency, inventory management, etc. In such an alarm condition situation, a notified user can then assess appropriate corrective action. A double check on the coating parameters, for example, may be an option.

In a further example of how a portion of a computer-based monitoring and control system can be configured within block 120, the following scenario is provided. There can be occurrences when the pH of the electrolyte within a rectifier/electrical system is too high, or too low. Depending on whether process 101 is an anodic or a cathodic process, different interpretations of the out of range parameter can be indicated. Corresponding corrective action options can be also be correlated to the out of range reading. If the process is anodic, a "higher than target range" pH (i.e. alkalinic) can mean that an excessive amount of solubilizer is in the solution. This condition can create difficulties in achieving a targeted film build. Corrective action can be, for example, overflowing the electrocoat tank with DI water to reduce the solubilizer level or sending permeate to drain to reduce the pH. Conversely, a "lower than target range" pH (i.e. acidic) reading is obtained for the electrolyte pH, then solubilizer could be added. For a cathodic process, a "higher than target range" pH may be indicative of a low solubilizer level in the solution and therefore may compromise the solubility of the electrocoating material (e.g. resin, paste, etc.) in the aqueous solution. A corrective action, therefore would be, for example, adding solubilizer to increase conductivity. Correspondingly, a "lower than target range" pH reading for the electrolyte pH of a cathodic process would then suggest, for example, that the electrocoat tank needed to be overflowed with DI water. The corrective actions can be automatically initiated by control module 47.

The ultrafiltation system, bag filters, heat exchanger, DI/RO water supply and holding tanks are further equipment within process block 120 that can be advantageously configured and linked with a monitoring and control system. Ultrafiltration systems are generally operated at specified pressures (inlet and outlet), and permeate flowrates, conductivity, pH. Key parameters that can be monitored with respect to the heat exchanger are the bath and coolant temperatures (inlet and outlet), as well as the pressure which can correlate to the flowrate of the liquid streams. For both the DI/RO water supply and the RO holding tank, pH, conductivity, and flow rate can be monitored and controlled either by automatic or manual techniques. A poorly conducting deionized water supply can indicate poor water quality which can lead to numerous problems with the electrocoating tank. Communication of such a condition from data module 45 to control module 47 can advantageously resolve the criticality within moments of detection. Module 47 can direct appropriate equipment to recharge the system with additional or new DI and/or RO water. Alternatively, the DI system can be recharged with chemicals to achieve acceptable conductivity of the water.

Similar to module 27, control module 47 can be configured to modify controllable equipment in response to information fed to it by data acquisition module 45.

Downstream from block 120 is a process portion that includes, among other things, a post rinse. This portion of the process is illustrated as block 130. A variety of electrocoat or liquid handling equipment is generally implemented within block 130, including a rinse tank, liquid delivery systems for the rinse tank, air blow-off, pumps, etc. Conveniently, a data acquisition module 55, equipped with corresponding evaluation and/or data retrieval tools connected to block 130 apparatus can be used to acquire, store and/or analyze process and/or product characteristics as substrate 200 is conveyed through block 130.

Parameters considered detectable within a post rinse system are pH, conductivity, temperature, liquid level, pressure, flow rates and the status of ion probes, pumps, valves, etc. Appropriate corrective actions that resolve any out of specification values, malfunctions, or other alert conditions can be accomplished by module 57 in similar fashion and technique as described for modules 37 and 47.

Finally, block 140 depicts the curing stages of process 101, where a bake or curing oven is implemented to harden or cure the deposited electrocoat material on substrate 200. As seen in FIG. 3, the final "product" at the end of process 101 is a substrate 200 having a layer of hardened electrodepositable coating composition (e.g., paint) on it. Typically, a curing block 140 includes a bake oven designed to accommodate the conveying system that moves electrocoated substrates through it to subject the substrates to elevated temperature. Cooling fans are also typically incorporated within block 140.

A key variable within block 140 is the temperature at which ovens are operated. A "too high" temperature can lead to over cure of coated substrate 200, which can subsequently lead to color, gloss and performance problems. Under-curing can result from "too low" oven temperatures; this condition also leading to product performance issues. Maintaining and adjusting the temperature of the ovens can be accomplished by control module 67 upon notification by data module 65.

Module 67 can also change the set point accordingly, to achieve a desired operating temperature or to adjust for alert conditions.

Numerous types of evaluation tools (e.g. sensors, probes, meters) plugged into an electrocoat process can be connected to and communicate with monitoring modules and/or control modules of the invention. The tools can be configured to measure and provide readings that correlate to a variety of process parameters, including, but not limited to, pH, temperature, pressure, conductivity, liquid level, line speed, equipment malfunction, equipment engagement (e.g. on/off), flowrate, voltage, amperage, flux, percent solids, concentration, inventory, filter efficiency, MEQ's (e.g., milliequivalents of solubilizer, volatile organic compound level (VOC in weight per unit volume) or combinations thereof.

Instead of, or in addition to directly linked tools, off-line quantative, qualitative, or analytical tests that measure certain parameters may be desirable or necessary. In such cases, samples from the electrocoat finishing process can be taken, and used to perform off-line tests. The results of the tests can then be manually (or automatically) inputted and logged into a data acquisition module for further processing and/or storage. Sampling is preferably performed according to a statistically sound sampling plan/schedule.

Data acquisition modules can be configured to also process, analyze and even generate reports. Of particular interest for electrocoating companies are software packages that can analyze data and provide the data calculated and manipulated within standards such as, for example, SPC and ISO certification guidelines. Other uses of the gathered data as contemplated by the invention include many aspects of running an electrocoating operation, such as for example, business planning, forecasting, capacity planning, and inventory management. Data acquisition modules capable of analyzing and manipulating data also preferably generates reports that are viewable on-screen or printable. Reports can include raw and/or manipulated data, charts (e.g. trend charts), time v. parameter correlations, etc. Preferably, reports can be requested by any authorized user, including those having remote access to the system.

Control modules of the invention can include hardware and software specifically tailored for process control. As discussed above, more than one control module may be necessary to control the electrocoat operation, particularly when the manufacturing process is relatively expansive and includes numerous equipment components.

Optionally, one or more display modules can be added to the system of the invention. The display module can be any conventional visual equipment or system such as a computer monitor or a continuous printout from a printer connected to either data acquisition modules or control modules. Monitors linked to a process management system can be used to display frames that represent control panels. Access (e.g. viewing, manipulating, adjusting) to the data and/or equipment, can be achieved through such frames.

Information retrieved and stored in the data and controls can be accessed, retrieved and analyzed by more than one user and independent of the user's location. As seen in the figures, recipients or users such as 310 and 320 can be located within the facility in which electrocoat process is located or, in certain embodiments users 310 and 320 are authorized users located off-site, at a remote location. Remote locations that may be desirably connected to a process management system includes for example, a user's home, hotel room, or "on-the-road." Remote access users who can take advantage of real-time data include, but are not limited to technical service representatives, raw material suppliers, engineers, data and/or control module software developers, maintenance, management, and marketing. Authorized users having access to the system of the invention can be given authority and the ability to troubleshoot, generate reports, or make modifications to the electrocoat finishing process.

The process management system of the invention can optionally be designed to be based on a client/server architecture. The system can also be expandable to include additional control modules as well as connectivity to other process or facility systems. Optionally, the system of the invention can be made to provide real-time alert information by sending alarm signals or messages directly to a user. This can be done in combination with or alternatively to the user accessing the information as his or her convenience. A real-time signal, for example, can be a page, email or text message to a pager, mobile phone, or other wireless device sent immediately when a data acquisition module inteprets data to be within an alarm range (outside a product or process specification).

Also optionally, a system according to the invention can be configured to be web-server based, linked into an Ethernet network, a serial bus, or PC-based. A back-up system can be maintained. Various configuration of server architecture can be implemented. In one aspect, a web server is incorporated with the system so that any authorized use can access nearly instantaneous information and observe real-time processing via any web browser.

According to a method of the invention, a process for monitoring an electrocoating operation can include establishing an acceptable range for various characteristics, parameters, and process variables, data (e.g. readings or values) corresponding to each of the characteristics, or parameters can then be obtained before, during, or after the operation of the process. The information and data can be analzyed (e.g. compared) to access whether the acquired values are within the acceptable range first established. By performing these steps, and possibly repeating the series of steps, a process can be run efficiently. Preventive actions as well as reactive or corrective actions can be automatically performed to operate the process in an optional fashion.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
  at least one data acquisition module configured to receive characteristics of an electrocoating operation in a facility;
  at least one process control module in communication with the at least one data acquisition module and the electrocoating operation; and
  a central control unit in communication with the at least one process control module, wherein the system provides real-time monitoring and controlling of the characteristics of the electrocoating operation, and wherein the central control unit is monitored and controlled by a user located within the facility.

2. The system of claim 1, wherein the at least one data acquisition module is integral with the at least one process control module.

3. The system of claim 1, further comprising a display module.

4. The system of claim 3, wherein the display module is wireless.

5. The system of claim 3, wherein the display module is a computer monitor.

6. The system of claim 5, wherein the monitor displays frames that represent a control panel, and wherein a user accesses at least one of data or equipment through the frames.

7. The system of claim 6, wherein the user is at a location remote from the facility in which the electrocoat operation is located.

8. The system of claim 1, wherein the data acquisition module includes statistical process control software.

9. The system of claim 1, wherein the at least one process control module comprises an output signal comprising at least one of a visual alert, an audible alert, an alarm, and a process adjustment.

10. The system of claim 9, wherein the output signal is transmittable to a wireless device.

11. The system of claim 1, wherein the data acquisition module comprises at least one probe configured to measure a parameter selected from a group consisting of pressure, temperature, PH, a concentration, conductivity, liquid level, microorganism count, microorganism type, and flow rate.

12. The system of claim 1, wherein the process control module is a programmable logic controller.

13. An electrocoating process comprising an electrocoat application system and a processor-based system in communication with the electrocoat application system, wherein the processor based system provides real-time monitoring and controlling of the electrocoat application system by an authorized user located within the facility in which the electrocoat application system is located.

14. The process of claim 13, further comprising a surface preparation system preceding the electrocoat application system; a post rinse system following the electrocoat application system; and a curing system following the post rinse system, wherein the processor-based system is in communication with and configured to monitor and control at least one of the surface preparation, electrocoat application, post rinse, and curing systems.

15. A method for monitoring an electrocoating operation, the method comprising: a) establishing an acceptable range for at least one characteristic of the operation; b) retrieving real-time data corresponding to the at least one characteristic; c) analyzing the data with statistical process control software; and d) assessing whether the data are within the acceptable range.

16. The method according to claim 15, farther comprising e) modifing a process parameter of the electrocoating operation if the data are not within the acceptable range.

17. The method according to claim 15, further comprising repeating steps b) through d) until the data are within the acceptable range.

18. The method according to claim 16, further comprising repeating steps a) through d).

19. The method according to claim 15, wherein the at least one characteristic is selected from the group consisting of liquid level, microorganism count, microorganism type, concentration, pH, pressure, temperature, conductivity, and flow rate.

20. The method according to claim 15, wherein step d) is performed by a user at the facility where the electrocoating operation is located.

21. The method according to claim 15, wherein step d) is performed by a user remote from the facility in which the electrocoating operation is located.

* * * * *